United States Patent

[11] 3,610,473

| [72] | Inventor | Eli Hochstetler<br>Star Route, Millersburg, Ohio 44654 |
|---|---|---|
| [21] | Appl. No. | 837,391 |
| [22] | Filed | June 30, 1969 |
| [45] | Patented | Oct. 5, 1971 |

[54] FLAIR-TYPE MATERIAL SPREADER
4 Claims, 8 Drawing Figs.

[52] U.S. Cl. .................................................. 222/178,
239/658
[51] Int. Cl. ...................................................... A01c 3/06
[50] Field of Search ........................................ 222/178,
409; 239/658; 263/33 C; 172/45; 56/29, 294

[56] References Cited
UNITED STATES PATENTS
2,958,530  11/1960  Kucera et al. ................... 239/658
3,011,793  12/1961  McElhinney et al. ........... 239/658 X
3,203,702  8/1965  Howard ............................ 239/658
3,414,199  12/1968  Ferris ............................... 239/658

FOREIGN PATENTS
974,696  8/1961  Germany ......................... 239/658

*Primary Examiner*—M. Henson Wood, Jr.
*Assistant Examiner*—Michael Mar
*Attorney*—Brady, O'Boyle & Gates

ABSTRACT: To prevent overloading and damage or destruction of the flair shaft bearings and the universal joints of the input drive shaft, the flail chains of the spreader are connected to the shaft in staggered relation along two spiral paths, thus avoiding a concentrated shock loading of the shaft bearings and universal joints when the chain flails engage the solid material.

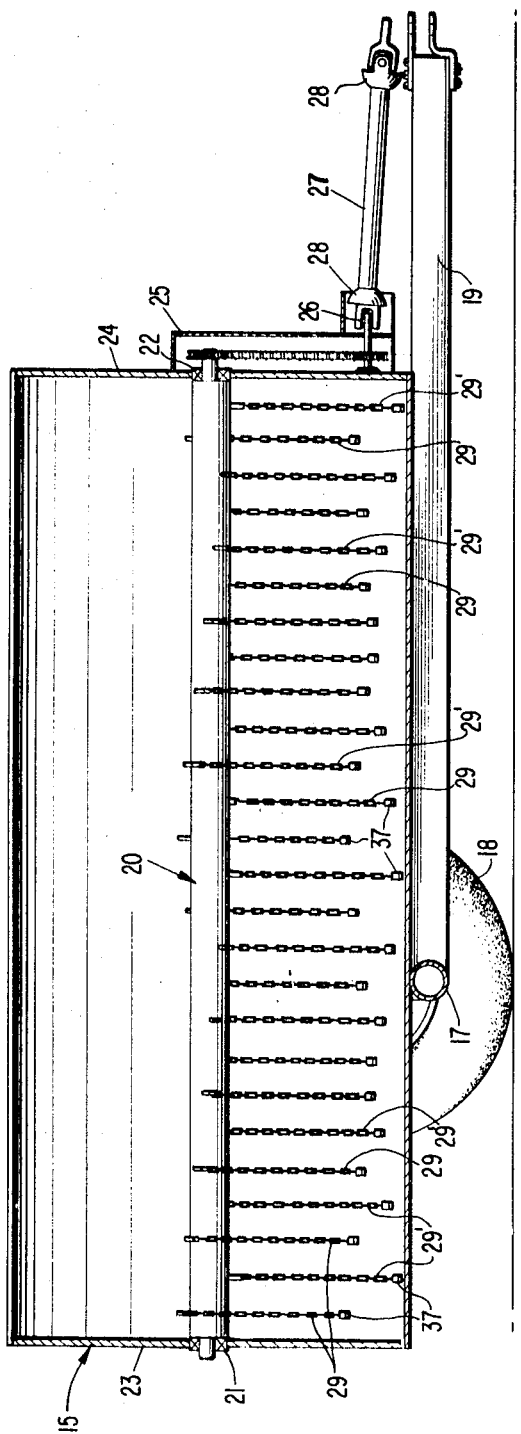
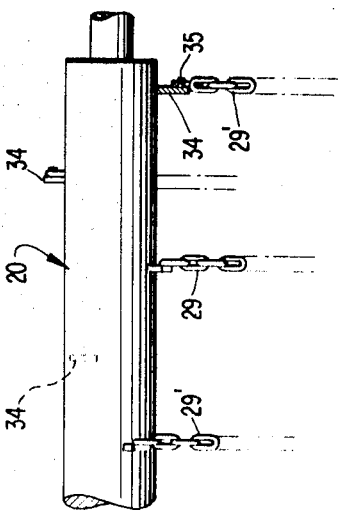
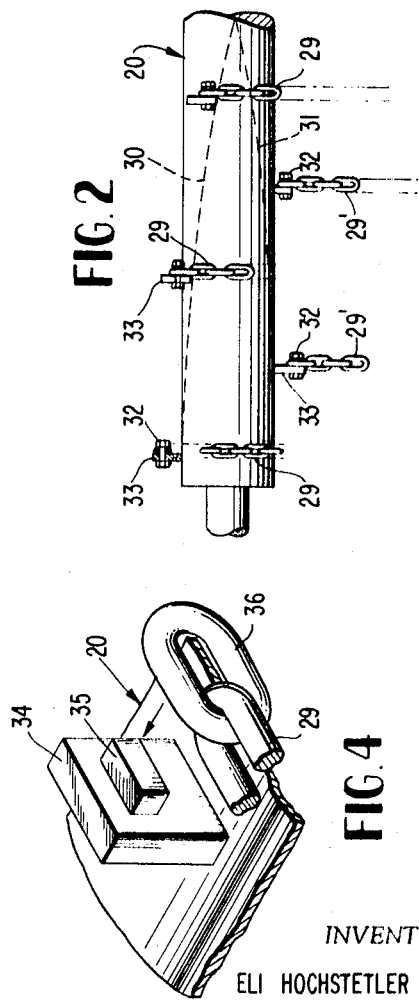
INVENTOR
ELI HOCHSTETLER
BY Brady, O'Boyle & Gates
ATTORNEYS

PATENTED OCT 5 1971

INVENTOR
ELI HOCHSTETLER

BY Brady, O'Boyle & Gates

ATTORNEYS

FLAIR-TYPE MATERIAL SPREADER

Flail-type spreaders or unloaders are well known in the art and are exemplified by prior U.S. Pat. Nos. 2,886,332; 3,229,985; 3,392,922 and 3,415,455. In general, these machines embody a wheeled cylindrically curved tank or hopper having a longitudinal horizontal axis rotary shaft to which a number of chain flails are attached along the length of the shaft. The spreader is drawn by a tractor and through suitable gearing, the rotary shaft is driven from the power takeoff shaft of the tractor through a suitable drive shaft having universal joints. The rotary flail shaft is journaled on sturdy bearings mounted at the ends of the hopper.

Customarily, the chain flails are attached in balanced relation to the rotary shaft at diametrically opposed points therealong. When the material, such as manure, in the hopper is struck by a group of chains on one side of the rotary shaft at relatively high velocity, a severe shock loading is transmitted through the chains and shaft to the shaft bearings, causing them to fail after as little as three months of machine operation. The same forces acting through the flail shaft and drive gearing are transmitted to the universal joints in the drive shaft leading from the tractor and with the conventional chain flail mounting the universal joints will frequently fail, particularly where the tractor is turning while the machine is running at full speed. Under these conditions, a very heavy torque and shock load adversely effects the universal joints.

These very serious difficulties of the prior art are successfully overcome in the present invention by an improved connection or mounting of the chain flails on their shaft so that the loading, due to contact of the chains with the material in the hopper, is distributed along the shaft at all times and is substantially even and does not build up or accumulate or produce a violent shock sufficient to cause bearing failure and/or damage or failure of the drive shaft universal joints. The chain flails are attached to the rotary flail shaft in groups along two separate helical paths which are out of phase circumferentially. The chain flails in one group or along one helical path are staggered longitudinally of the rotary shaft axis relative to the flails in the other group so that an even distribution loading along the length of the shaft is obtained as the chain flails encounter the solid material in the hopper.

Other features and advantages of the invention will become apparent during the course of the following detailed description.

BRIEF DESCRIPTION OF DRAWING FIGURES

FIG. 1 is a partly diagrammatic side elevation, partly in section, through a chain flail material spreader embodying the invention;

FIG. 2 is an enlarged fragmentary side elevation of a flail chain rotary shaft showing groups of chains attached to the shaft along two helical paths;

FIG. 3 is a view similar to FIG. 2 showing another section of the shaft and showing a modified means for attaching the individual chain flails to the shaft;

FIG. 4 is an enlarged fragmentary perspective view of the modified chain attaching means;

DETAILED DESCRIPTION OF PREFERRED EMBODIMENT

Figure 5:
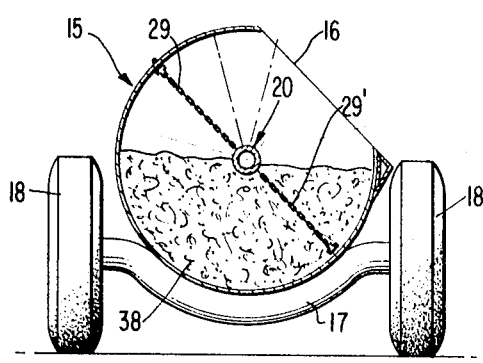
FIG. 5 is a transverse vertical section taken on line 5—5 of FIG. 6.

Referring to the drawings in detail, wherein like numerals designate like parts throughout the same, the numeral 15 designates a container or hopper for manure or the like, the container being cylindrical, FIG. 5, and having a horizontal longitudinal axis. The container 15 has a filling and discharge opening 16 extending substantially for its entire length, the opening being angled toward one side of the container near the top thereof to facilitate discharging material at one side of the machine. The container 15 is suitably cradled on an axle structure 17 having ground-engaging wheels 18, and a horizontal tongue 19 extends beneath and forwardly of the container for attachment to the draw bar of a tractor, not shown.

Mounted centrally and axially within the container 15 is a rotary flail shaft 20 whose ends are journaled for rotation in sturdy bearings 21 and 22 carried by the end walls 23 and 24 of the container or hopper. Rotation is imparted to the shaft 20 through conventional gearing 25 adjacent the forward end wall 24 having an input shaft 26 driven by a drive shaft 27 having universal joints 28 therein. The drive shaft 27 is connected with the usual rotary power takeoff shaft of a tractor, not shown. The construction thus far described is substantially conventional and is shown to a great extent by any one of the aforementioned United States patents and need not be dealt with in greater detail for proper understanding of the invention.

The invention proper resides in the particular manner of arranging the chain flails on the rotary shaft 20 to avoid severe overloading and shock loading of the shaft bearings 21 and 22 and the universal joints 28. Toward this end, a multiplicity of equal length chain flails are attached to the shaft 20 in two separate groups with each group of flails arranged in a separate spiral path along the shaft 20, such paths being indicated by the broken lines 30 and 31 in FIG. 2. The chain flails in the two groups are numbered 29 and 29', respectively, and it may be seen by an inspection of the drawing that the chain flails of each group along each spiral path are equidistantly spaced longitudinally of the shaft 20 and additionally the flails of one group are staggered longitudinally with respect to the flails of the second group. The two spiral groups of flails and their spiral paths are also out of phase circumferentially of the shaft axis substantially 180° as viewed from the end of the shaft 20 in FIG. 5. The two endmost flails 29 and 29' of each spiral group are approximately 180° apart circumferentially and the succeeding flails 29 and 29' of each group are anchored to the shaft 20 along the two separate spiral paths 30 and 31 so that a maximum distribution of chain flails is obtained along the shaft.

Referring to FIG. 2, the inner links of each flail 29 and 29' are secured by bolts 32 to lug elements 33 rigidly attached to the shaft 20. Alternatively, as shown in FIGS. 3 and 4, the shaft 20 may carry rigid lug elements 34 having side projections 35 which enter the innermost chain link 36 of each flail 29 and 29'. The projection 35 may be welded to the chain link 36 to form a secure attachment.

The ends of the individual flails 29 and 29' are equipped with T-heads 37 which pass close to the interior surface of the cylindrical sidewall of the hopper 15 during rotation of the shaft 20.

Figure 6:
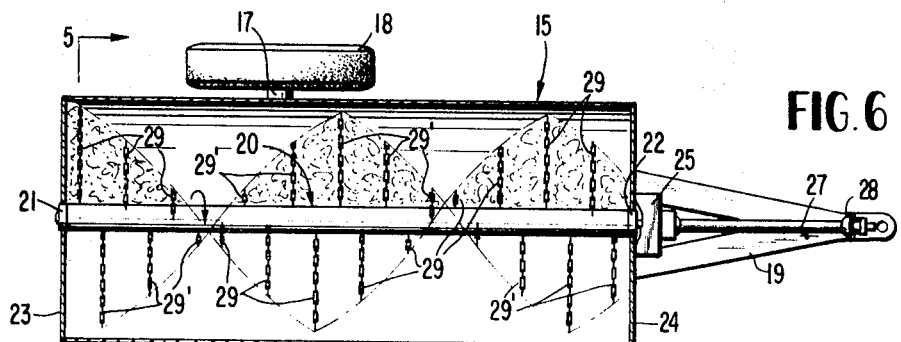
FIGS. 6, 7 and 8 are plan views of the spreader showing the arrangement of chain flails on the rotary shaft during several increments of shaft rotation.
Figure 7:
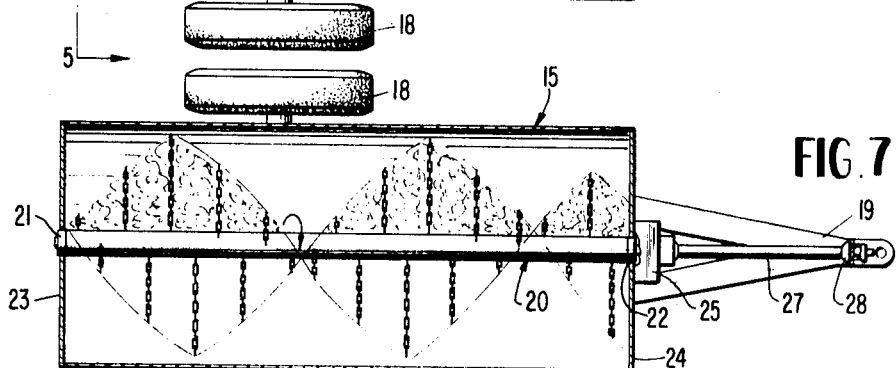
Figure 8:
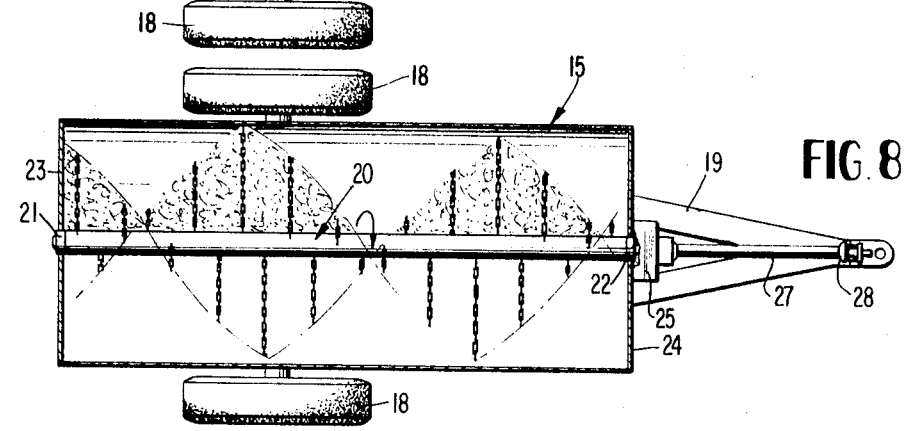

FIGS. 6, 7 and 8 show the disposition of the flails 29 and 29' in the two spiral groups during three positions of rotation of the shaft 20. In these figures, the flails are all shown extended to their full lengths although they appear to the eye as being foreshortened because of their angular relationship to the shaft 20 from which they radiate. An inspection of FIGS. 6–8 will show that the tips of the flails 29 and 29' all lie on a definite sinusoidal path or curve and the sinusoidal curves for the two distinct groups of flails 29 and 29' are out of phase approximately 180°, FIG. 6. As the shaft 20 revolves, FIGS. 7 and 8, the ever-changing relationship of the two spiral groups of flails along the shaft is clearly evident. Consequently when the chain flails encounter the solid material 38, such as manure, in the hopper 15, some flails at one region along the shaft 20 will be initially contacting the material, while further down the shaft, other flails will be passing through or beyond the mass of material to unload or spread it at one side of the machine through the oblique opening 16. Therefore, the load transmitted through the flails 29 and 29' to the rotary shaft 20, its bearings 21 and 22, and universal joints 28 will be substantially uniform and distributed along the shaft without severe shocks, as would occur were the chain flails merely attached in two rows at diametrically opposite points along the shaft.

The invention arrangement of flails extends the life of shaft bearings many times beyond their expected life on conventional flail spreaders and the universal joints 28 will not fail even during sharp turning of the tractor while the shaft 20 is running at full speed. It is believed that the significant improvement in the flail arrangement which is the essence of the invention will now be readily understood by those skilled in the art without further description.

I claim:

1. A material spreader comprising a wheeled material hopper adapted to be drawn by a tractor, said hopper being substantially cylindrical on a horizontal axis and said axis extending longitudinally of the direction of draft of the hopper, said hopper having an oblique material discharge opening permitting material to be discharged along one side of the line of draft, a longitudinal rotary flail shaft extending through the hopper centrally, flail shaft bearings on the end walls of the hopper, gearing connected with one end of the flail shaft to rotate the same, a drive shaft including universal joints connected with the gearing and adapted for connection with a tractor power takeoff shaft, and a multiplicity of chain flails anchored to the flail shaft along the length thereof in substantially equidistantly spaced relation and all being of substantially equal length with their tips extending close to the cylindrical sidewall of the hopper, said chain flails arranged in two distinct groups and with the flails of each group attached to the flail shaft at points which lie along separate helical paths which are circumferentially out of phase, and the flails of one group being staggered with respect to the flails of the other group longitudinally of the flail shaft so as to lie substantially midway between the flails of the other group in alternating relation therewith along said shaft.

2. The structure of claim 1, and a series of fixed lug elements on the flail shaft in spaced staggered relation along said separate helical paths, and bolts securing the inner links of the flails to said lug elements.

3. The structure of claim 1, and a series of fixed lug elements on the flail shaft in spaced relation along said separate helical paths, side projections on the lug elements rigid therewith, the innermost links of the chain flails receiving said side projections of the lug elements and anchored thereto.

4. The structure of claim 3, and said links anchored to the side projections of the lug elements by welding.

UNITED STATES PATENT OFFICE
CERTIFICATE OF CORRECTION

Patent No. 3,610,473     Dated   October 5, 1971

Inventor(s)   Eli Hochstetler

It is certified that error appears in the above-identified patent and that said Letters Patent are hereby corrected as shown below:

Page 1, in the heading of the patent, in the title change "FLAIR" to -- FLAIL --.

In the ABSTRACT, line 2, change "flair" to --flail--.

Column 1, line 1, in the title change "FLAIR" to --FLAIL--.

Signed and sealed this 28th day of March 1972.

(SEAL)
Attest:

EDWARD M. FLETCHER, JR.        ROBERT GOTTSCHALK
Attesting Officer        Commissioner of Patents